US009954880B2

(12) United States Patent
Mason

(10) Patent No.: US 9,954,880 B2
(45) Date of Patent: Apr. 24, 2018

(54) PROTECTION VIA WEBPAGE MANIPULATION

(71) Applicant: salesforce.com, inc., San Francisco, CA (US)

(72) Inventor: Paul Anthony Mason, Baglan (GB)

(73) Assignee: salesforce.com, inc., San Francisco, CA (US)

(*) Notice: Subject to any disclaimer, the term of this patent is extended or adjusted under 35 U.S.C. 154(b) by 181 days.

(21) Appl. No.: 14/928,340

(22) Filed: Oct. 30, 2015

(65) Prior Publication Data

US 2017/0126719 A1    May 4, 2017

(51) Int. Cl.
| | | |
|---|---|---|
| *H04L 29/06* | (2006.01) | |
| *H04L 29/08* | (2006.01) | |
| *G06F 17/22* | (2006.01) | |
| *G06F 21/00* | (2013.01) | |
| *G06F 21/56* | (2013.01) | |

(52) U.S. Cl.
CPC ........ *H04L 63/1425* (2013.01); *G06F 17/227* (2013.01); *G06F 17/2247* (2013.01); *G06F 21/00* (2013.01); *G06F 21/566* (2013.01); *H04L 63/145* (2013.01); *H04L 67/02* (2013.01); *H04L 67/42* (2013.01); *H04L 63/1483* (2013.01)

(58) Field of Classification Search
CPC ... H04L 63/1425; H04L 63/145; H04L 67/02; H04L 67/42; G06F 17/2247; G06F 17/227; G06F 17/30598; G06F 17/30864; G06F 17/30896
See application file for complete search history.

(56) References Cited

U.S. PATENT DOCUMENTS

| | | | | |
|---|---|---|---|---|
| 6,857,102 | B1 * | 2/2005 | Bickmore | G06F 17/2247 707/E17.121 |
| 7,752,534 | B2 * | 7/2010 | Blanchard, III | G06F 17/22 715/201 |
| 9,241,004 | B1 * | 1/2016 | April | G06F 21/606 |
| 9,325,734 | B1 * | 4/2016 | Peacock | G06F 17/2247 |
| 9,477,836 | B1 * | 10/2016 | Ramam | G06F 21/6263 |
| 9,489,526 | B1 * | 11/2016 | Call | G06F 21/62 |
| 9,544,318 | B2 * | 1/2017 | Tatourian | H04L 63/1416 |
| 9,614,862 | B2 * | 4/2017 | Stern | H04L 63/1425 |
| 9,639,519 | B1 * | 5/2017 | Sebastian | G06F 17/272 |
| 9,641,591 | B1 * | 5/2017 | Kolam | H04L 67/02 |

(Continued)

*Primary Examiner* — Beemnet Dada
*Assistant Examiner* — Stephen Gundry
(74) *Attorney, Agent, or Firm* — Meyertons, Hood, Kivlin, Kowert & Goetzel, P.C.

(57) ABSTRACT

Techniques are disclosed relating to limiting malicious-code analysis of webpage content. In one embodiment, a computing system receives a webpage requested by a client device. The computing system randomly alters content of the webpage to limit analysis of the content by malicious code such that the altering does not affect how the webpage is displayed by the client device. The computing system may then serve the webpage with the altered content to the client device. In some embodiments, the altering includes searching the webpage for an HTML element that specifies a plurality of attributes in a particular ordering and rearranging the plurality of attributes to have a new ordering different from the particular ordering. In some embodiments, the altering includes parsing the webpage for an HTML element that specifies an identifier attribute and modifying an identifier attribute of the element.

16 Claims, 5 Drawing Sheets

(56) References Cited

U.S. PATENT DOCUMENTS

| | | | |
|---|---|---|---|
| 2002/0198743 A1* | 12/2002 | Ariathurai | G06Q 30/02 705/4 |
| 2008/0046562 A1* | 2/2008 | Butler | G06F 17/3089 709/224 |
| 2012/0124372 A1* | 5/2012 | Dilley | H04L 67/2819 713/162 |
| 2015/0082152 A1* | 3/2015 | Bougon | H04L 67/02 715/236 |
| 2016/0006750 A1* | 1/2016 | Yang | G06F 21/55 726/22 |
| 2016/0088015 A1* | 3/2016 | Sivan | H04L 29/06 726/23 |
| 2016/0099955 A1* | 4/2016 | Wespel | H04L 63/1416 726/23 |
| 2016/0140530 A1* | 5/2016 | Drey | G06Q 20/145 705/14.55 |
| 2016/0150013 A1* | 5/2016 | Kolam | H04L 67/2842 709/224 |
| 2016/0173635 A1* | 6/2016 | Kolam | H04L 67/2842 709/217 |
| 2016/0182517 A1* | 6/2016 | Sullivan | H04L 63/10 713/171 |
| 2016/0182534 A1* | 6/2016 | Yang | G06F 21/55 726/1 |
| 2016/0182537 A1* | 6/2016 | Tatourian | H04L 63/1416 726/23 |
| 2016/0205213 A1* | 7/2016 | Kolam | H04L 67/32 709/218 |
| 2016/0239880 A1* | 8/2016 | Blanchfield | G06Q 30/0277 |
| 2016/0261715 A1* | 9/2016 | Luria | H04L 67/02 |
| 2016/0269429 A1* | 9/2016 | Martini | H04L 63/1416 |
| 2016/0283606 A1* | 9/2016 | Xiong | G06F 17/30861 |
| 2016/0321221 A9* | 11/2016 | Patrick | G06F 17/2229 |
| 2016/0359901 A1* | 12/2016 | Yang | H04L 63/1441 |
| 2017/0041338 A1* | 2/2017 | Martini | G06F 21/566 |
| 2017/0093925 A1* | 3/2017 | Sheretov | H04L 63/20 |
| 2017/0111431 A1* | 4/2017 | Scoda | H04L 67/025 |

* cited by examiner

PROTECTION VIA WEBPAGE MANIPULATION

BACKGROUND

Technical Field

This disclosure relates generally to computer networks, and, more specifically, to manipulating webpage content.

Description of the Related Art

Over the years, various forms of malware have been developed such as viruses, trojan horses, worms, etc. Some types of malware may merely perform annoying actions such as display advertisements to the user (e.g., adware) and slowing computer performance by consuming computer resources. In other instances, more advanced malware may attempt collect various forms of confidential information that may be useable for some malicious purpose—e.g., identify theft.

Various techniques have been developed to find and eradicate malware. Some techniques may, for example, analyze file signatures and executable behaviors in order to identify potential malware. Once identified, various actions may be taken to remove the malware—or at least isolate it so that it is no longer a potential threat.

Figure 1:
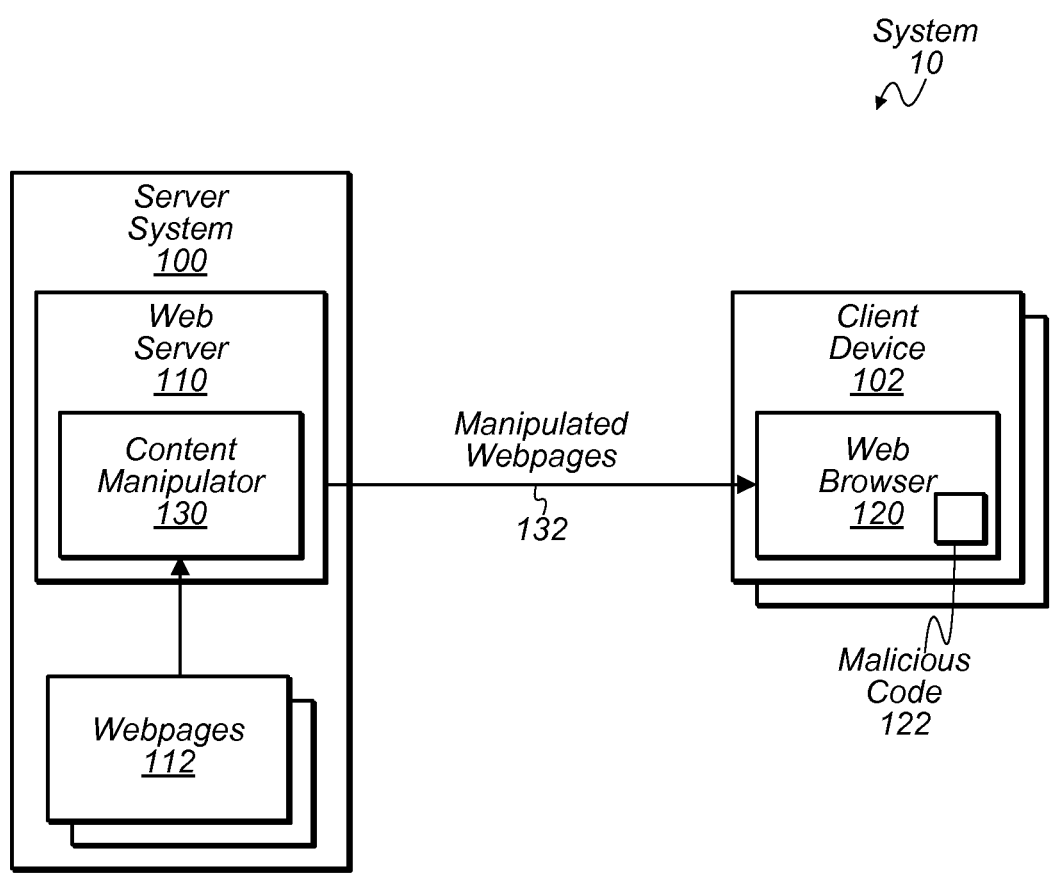
FIG. 1 is a block diagram of one embodiment of a computing system configured to manipulate webpage content supplied to a potentially compromised client device.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a graph having multiple, the terms "first" and "second" nodes can be used to refer to any node within the graph. In other words, the "first" node is not limited to an initial node in the graph, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure is concerned with a particular form of malware that attempts to analyze web traffic (e.g., hypertext transfer protocol (HTTP) traffic) being delivered to a web browser on a client device. In some instances, this type of malware may examine webpage content for particular features that can be used to glean information about the content being viewed. For example, the malware may compute a hash value of a webpage and compare it with a hash value of a known webpage. If a match is detected, the malware can potentially determine the identity of the webpage being viewed—i.e., that the user is viewing the known page. As another example, the malware may attempt to identify hypertext markup language (HTML) elements that have multiple attributes specified in a particular ordering. Finding a particular one of these elements may indicate the presence of desired information. For example, this particular element might be located near confidential information about the user. The malware may attempt to capture this information by applying a particular parsing rule that is applicable only when the attributes have a particular ordering. That is, if this ordering were different, however, this rule might not be able to identify this information. As used herein, the term "element" refers generally to an item that is specified in a webpage and that can have one or more attributes also specified in the webpage. The term "attribute" refers to a specified property of an element in a webpage. As used herein, the term "HTML element" is to be interpreted according to its understood meaning in the art, and includes an HTML construct that includes a start tag, an end tag, and content located between the tags. The term "HTML attribute" is to be interpreted according to its understood meaning in the art, and includes an attribute specified within a start tag of an HTML element. For example, in the HTML element <iframe src="about:blank" . . . > . . . </iframe>, src="about:blank" is an HTML attribute of the iframe HTML element.

The present disclosure describes embodiments in which various techniques are used to modify webpage content in order to limit analysis by malware, but without altering how the content appears to a user. As discussed below, a server system may execute a content manipulator, in some embodiments, that randomly alters content of webpages being served to various client devices. (As used herein, the term "random" is to be interpreted according to its understood meaning in the art, and includes the use of pseudo random number generators. The term "pseudo random number generator" is also to be interpreted according to its understood meaning in the art, and includes any of various known algorithms that can generate a sequence of numbers or symbols that cannot be reasonably predicted.) For example, in some embodiments, the manipulator randomly alters the specified ordering of attributes for one or more HTML elements in a webpage. Because changing the ordering does affect how a webpage is presented, each client device may display the webpage in a similar manner; however, content within each webpage (i.e., within each HTML file) differs between client devices. In doing so, the manipulator may thwart malware that, for example, attempts to compare a webpage received at a client with a known webpage for some malicious purpose, or search for content having attributes specified in a particular ordering.

Turning now to FIG. 1, a block diagram of a computing system 10 for manipulating webpage content is depicted. In the illustrated embodiment, system 10 includes a server system 100 and one or more client devices 102. As shown, server system 100 includes a web server 110, a set of webpages 112, and a content manipulator 130. Client device 102 includes a web browser 120, which may include malicious code 122. In some embodiments, system 10 may be implemented differently than shown. For example, in some embodiments, webpages 112 and/or content manipulator 130 may reside in a computer system separate from system 100. In some embodiments, malicious code 122 may not be located in web browser 120.

Server system 100, in one embodiment, is configured to send webpages of a website to requesting client devices 102. In various embodiments, server system 100 is configured to execute a web server 110 (e.g., an Apache HTTP Server) that handles receiving requests and satisfying the requests by serving stored webpages 112. In various embodiments, server 110, webpages 112, and content manipulator 130 are stored in a non-transitory computer readable medium, such as memory 520 described below with respect to FIG. 5. Server 110 and manipulator 130 may be executable by one or more processors of system 100, such as processor subsystem 580 discussed below. In some embodiments, server system 100 may be a single computer system. In other embodiments, server system 100 is a computer cluster (i.e., a computer cloud) that includes multiple computer systems working together.

Client device 102, in one embodiment, is configured to execute a web browser 120 that requests webpages from server system 100. Accordingly, browser 120 may establish an HTTP session with server 110 through which browser 120 may receive one or more HTML files that are then render on a display of client device 102. Client device 102 may be implemented by any suitable computing device such as those described below with respect to FIG. 5.

Malicious code 122, in one embodiment, is executable to analyze the HTTP traffic being received by browser 120 for some malicious purpose. (As used herein, the term "malicious code" is to be interpreted according to its understood meaning in the art, and includes any type of malware such as adware, viruses, worms, rootkits, Trojan horses, etc.) In some embodiments, this analysis may include merely comparing webpage content with content of a known webpage (e.g., based on computed hash values from the content). In some embodiments, this analysis may include searching webpage content for unique characteristics that can be used to determine information about a webpage. For example, code 122 may parse HTTP traffic to search for elements that specify attributes in a particular ordering (or, more generally, may perform an analysis that relies on an element's attributes having a particular ordering). In some embodiments, code 122 may also search for particular identifier attributes that may be unique to a given page. (As used herein, the term "identifier attribute" refers to an attribute that specifies a unique identifier for an element within a webpage. When an "identifier attribute" is described as being included in an HTML element, this term refers to attribute having the following construct: id="XXX" where XXX is an alphanumeric value.)

Content manipulator 130, in one embodiment, is executable to modify webpages 112 to limit analysis by malicious code 122. As noted above, in various embodiments, the manner in which manipulator 130 modifies webpages 112 to produce modified webpages 132 does not alter how a webpage is displayed on a client device 102. Thus, while two client devices 102 may receive different versions of the same webpage (or even an unmodified version of webpage), the webpages appear the same to users of both devices 102. As discussed below with respect to FIG. 2, in some embodiments, manipulator 130 may modify webpages 112 by analyzing a webpage for particular elements that specify multiple attributes and rearranging an ordering of the attributes. For example, if an element specifies attribute 1, attribute 2, and attribute 3, manipulator 130 may alter this ordering so that the element now specifies the attributes as attribute 2, attribute 1, and attribute 3. Altering webpage content in this manner may interfere with malicious code 122's ability to compare content of a recently received webpage with content from an unaltered version of the webpage. It may also interfere within any analysis that depends on the attributes having a particular ordering. In various embodiments, manipulator 130 also alters the content of attributes—specifically, the content of attribute identifiers in some embodiments. For example, if an attribute identifier is id="Salesforce", the attribute identifier may be altered to recite "Sfad395234". Altering the attribute in this manner may prevent malicious code 122 from determining that webpage has content from Salesforce™, for example. In some embodiments, manipulator 130 also inserts white space into the webpage at particular locations that do not affect how the webpage is viewed. As used herein, the term "white space" is to be interpreted according to its understood meaning in the art, and includes any character or sequence of that insert horizontal or vertical space such as the space character, tab character, newline character, and carriage-return character. For example, white space may be inserted between HTML attributes in an HTML start tag. In some instances, inserting characters (i.e., white space) in to an HTML file may prevent, for example, an analysis that relies on computed hash values, which may be computed from these additional characters. It may also interfere with particular parsing algorithms that do not account for the insertion of white space. As discussed below, in various embodiments, manipulator 130 uses a pseudo-random number generator to introduce variation when modifying one webpage to the next. Thus, two client devices 102 requesting the same webpage 112 may receive manipulated webpages 132 that differ from one another. In some instances, introducing this additional variation may further complicate code 122's analysis of webpage content.

In some embodiments, content manipulator 130 dynamically modifies content of webpages 112 as the webpages are requested by client devices 102. That is, in response to receiving an HTTP request, manipulator 130 may retrieve the requested webpage 112 and proceed to randomly modify content within it to produce a manipulated webpage 132 that is provided to a client device 102. Thus, if two client devices request the same webpage 112, they may receive different versions of the same webpage 112. In other embodiments, however, manipulator 130 modifies content of pages 112 independent of requests from client devices 102. For example, manipulator 130 may alter content in webpages 112 once a day. Thus, two client devices 102 requesting the same page today may receive the same page, but would receive a different one if they sent requests tomorrow. Still further, manipulator 130 may produce two or more versions of the same webpage each day, so that two client devices 102 may still receive different versions of the same webpage. In some embodiments, manipulator 130 does not modify every webpage 112, but rather is configurable to modify (or not modify) selected webpages 112. For example, manipulator 130 may use a white list as discussed with respect FIG. 2.

Although manipulator 130 is shown within web server 110 in the illustrated embodiment, as noted above, manipulator 130 may be located externally to server 110 or even server system 100 in some embodiments. For example, in some embodiments, manipulator 130 may be located on another computer system that works with server system 100 to deliver webpage content to client device 102. In such an embodiment, manipulator 130 may periodically retrieve and modify webpages 112 in a storage, which is later accessed by server system 100 when a particular webpage 112 is requested.

Figure 2:
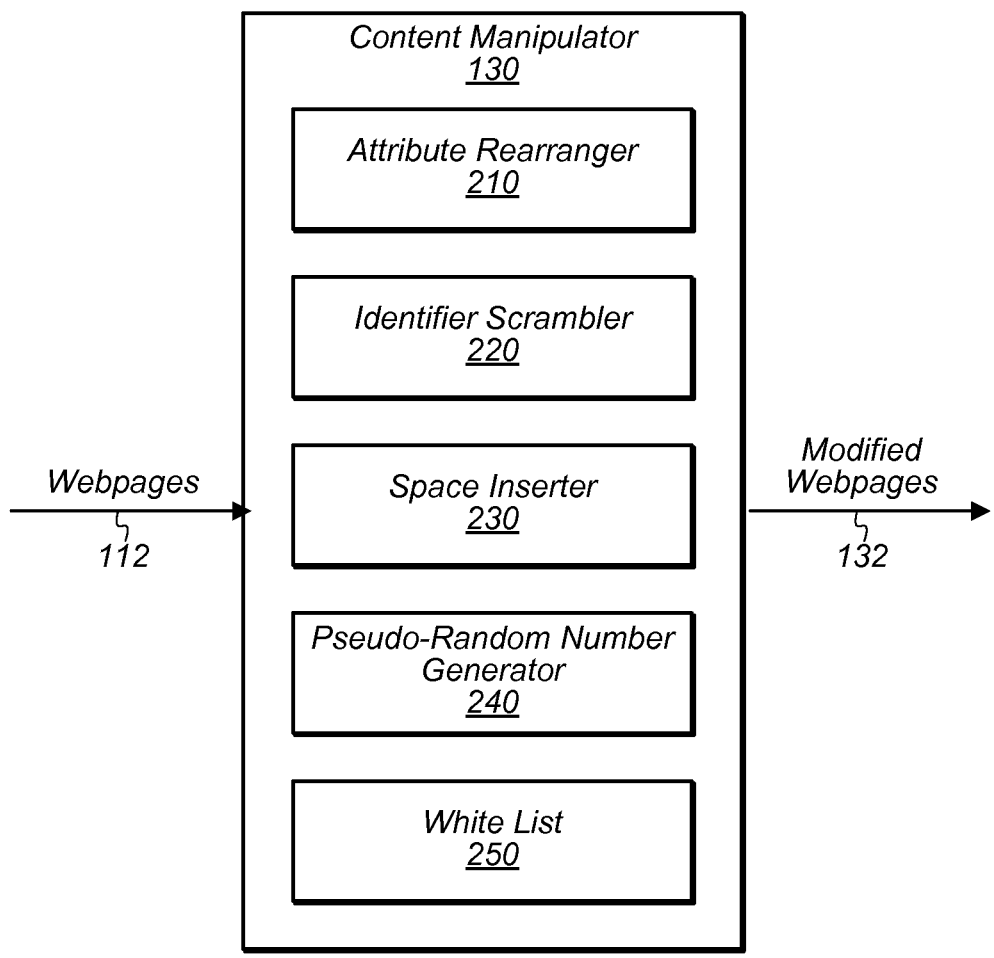
FIG. 2 is a block diagram illustrating one embodiment of a content manipulator executable to modify webpage content.

Turning now to FIG. 2, a block diagram of content manipulator 130 is depicted. In the illustrated embodiment, content manipulator 130 includes attribute rearranger 210, identifier scrambler 220, space inserter 230, a pseudo-random number generator (PRNG) 240, and white list 250. In some embodiments, manipulator 130 may be implemented differently than shown. Accordingly, in some embodiments, manipulator 130 may not include components 240 and/or 250.

Attribute rearranger 210, in one embodiment, is executable to search a webpage 112 for elements that specify multiple attributes and to rearrange the ordering in which the attributes are specified. In various embodiments, rearranger 210 identifies elements with multiple attributes using parsing algorithm that analyzes character sequences in an HTML file. For example, in the case of HTML elements, rearranger 210 may search for the characters < > denoting the presence of an HTML tag and may identify the attributes within the tag based on the presence of an = character. In response to identifying multiple attributes, rearranger 210 may alter their ordering. As noted above, this type of alteration may interfere within any analysis that depends on the attributes having a particular ordering—e.g., a comparison based on hash values, an analysis that uses a parsing rule premised on webpage content satisfying a particular grammar, etc. In some embodiments, rearranger 210 may use PRNG 240 to determine how to randomly rearrange attributes. For example, outputs of PRNG 240 may be used to select which attribute appears first, which attribute appears second, and so on. In some embodiments, PRNG 240 may also be used to determine which elements to modify (as opposed to rearranging the attributes for each element with multiple attributes). Examples of possible outputs using rearranger 210 are presented below with respect to FIG. 3.

Identifier scrambler 220, in one embodiment, is executable to parse a webpage for identifier attributes and to alter the characters within the attributes. For example, in the case of HTML identifier attributes, scrambler 220 may search a webpage for the characters id=" . . . " and replace the characters for . . . . In some instances, the same identifier attribute may appear in multiple elements within a webpage. In some embodiments, scrambler 220 is executable to identify when the same identifier attribute appears in multiple elements and to modify each instance of the attribute to have same character sequence. Thus, for example, if the attribute id="omniture_beacon_iframe" appears multiple times and is replaced by id="JAsdlkj35sadf9", each instance of the attribute is replaced with id="JAsdlkj35sadf9". In some embodiments, scrambler 220 uses PRNG to select the character sequence used to modify a given attribute identifier. As noted above, modifying attribute identifiers may interfere with malicious code 122's ability to search for particular attribute identifiers in a webpage. An example of a possible output using scrambler 220 is presented below with respect to FIG. 3.

Space inserter 230, in one embodiment, is executable to identify locations for inserting white space and to insert white space into one or more of those locations. In various embodiments, inserter 230 may use a parsing algorithm to identify locations that would not alter appearance of the webpage if white space is inserted at the locations. In some embodiments, inserter 230 uses PRNG 240 to select the one or more locations to insert the white space. For example, inserter 230 may identify an initial set of locations to insert white space, and PRNG 240 may be used to select a subset of those locations. In some embodiments, inserter 230 uses PRNG 240 to select an amount of the white space to insert at the one or more locations. For example, an output of PRNG 240 may indicate that a first location should have five space characters and a second location should have eight space characters. An example of a possible output using inserter 230 is presented below with respect to FIG. 3.

In various embodiments, components 210-230 support languages other than HTML that may be included within a webpage. That is, although various examples are presented using HTML elements and attributes, in some embodiments, components 210-230 operate in a similar manner using other languages found in webpages such as Java™, the extended markup language (XML), JavaScript Object Notation (JSON), etc. For example, in the JSON element "address": {"streetAddress": "1600 Pennsylvania Ave NW", "city": "Washington", "state": "DC", "postalCode": "20500"}, the ordering of streetAddress, city, state, and postalCode may be alerted by rearranger 210. Thus, descriptions presented herein with respect to HTML elements and attributes are not intended to be limiting, but rather to provide examples of elements and attributes.

Pseudo-random number generator (PRNG) 240, in one embodiment, is executable to generate a pseudo-random output that is usable by components 210-230. PRNG 240 may use any suitable algorithm for determining an output such as the Yarrow algorithm, Fortuna algorithm, etc. In some embodiments, PRNG 240 is accessible to manipulator 130 via an application programming interface (API) call to a supported library routine—e.g. a call to Java's Math.random( ) routine. PRNG 240 may also take any suitable seed value. For example, in one embodiment, PRNG 240 may use a timestamp value. In some embodiments, PRNG 240 may also use an identifier of a user name associated with a user of client device 102, an identifier of an organization associated with the user, and/or an identifier for the element that is being modified by one of components 210-230. In some embodiments, PRNG 240 may use a seed value that also includes a customer identifier. That is, server system 100 may provide multiple services to customers through a website hosted by server 110. When a user affiliated with a particular one of the customers accesses a webpage 112 via a client device 102, a customer identifier of the particular customer may be included in the seed value used by PRNG 240. In some instances, using a seed value that is based on something other than merely a time stamp may make the output of PRNG 240 less predictable.

White list 250, in one embodiment, is a list of webpages 112 that are not to be modified by manipulator 130. As noted above, in some embodiments, manipulator 130 may modify only a subset of webpages 112 as specified by, for example, a user of manipulator 130. Accordingly, in such an embodiment, a user may record the uniform resource locators (URLs) of particular webpages that are exempt from modification, and manipulator 130 may verify that a particular page 112 is not on list 250 before modifying content in the page 112. Although list 250 is depicted as a white list, in other embodiments, list 250 may be a black list that identifies webpages 112 that are to be modified. In such an embodiment, manipulator 130 may examine the list 250 and modify only webpages if they are specified in the list 250.

Figure 3:
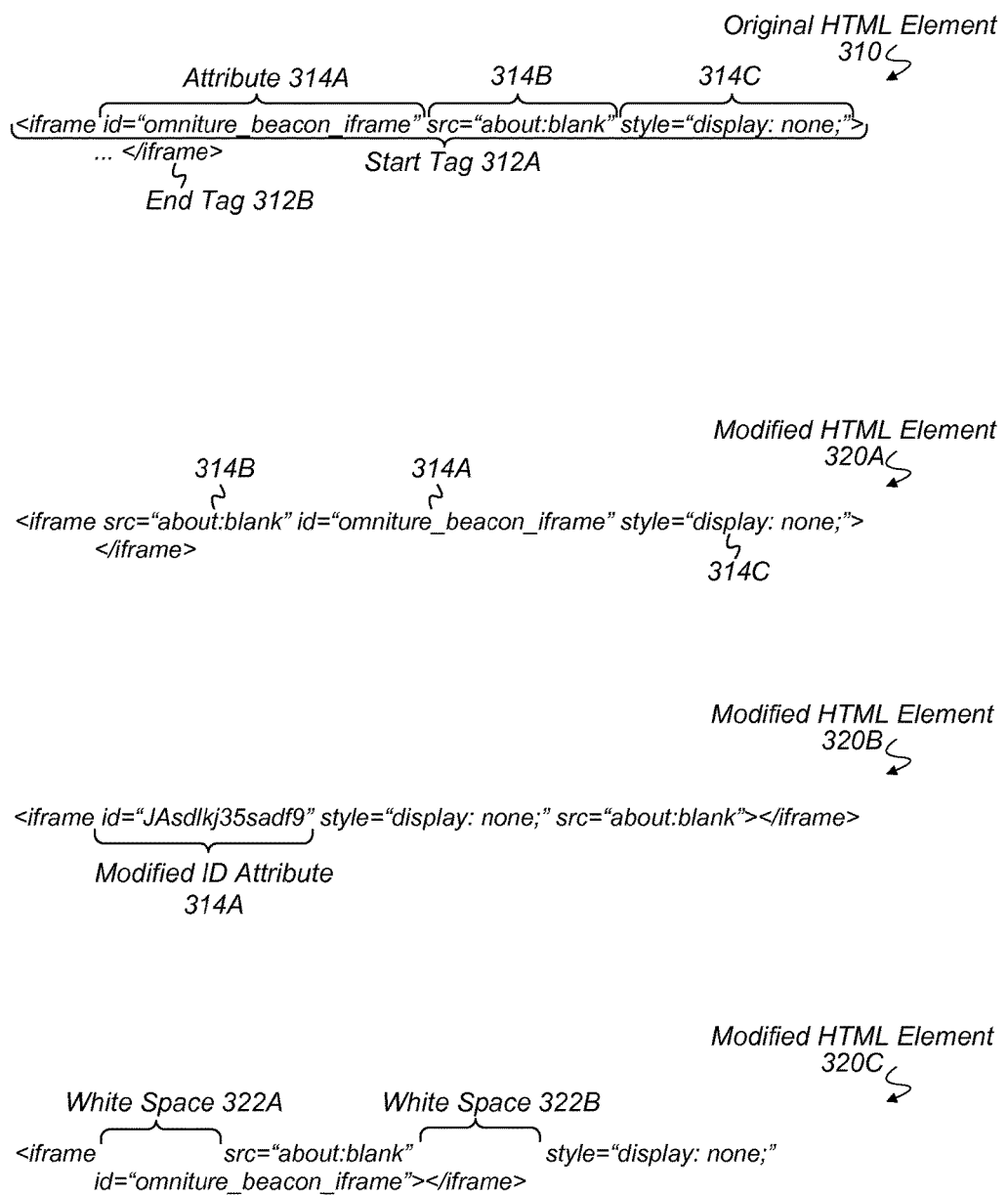
FIG. 3 is a diagram illustrating examples of modified webpage content.

Turning now to FIG. 3, a diagram illustrating exemplary modifications of an HTML element is depicted. As show, a webpage may include an original HTML element 310 (a frame HTML element in this example) that has a start tag 312A and an end tag 312B. The start tag 312A may specify multiple attributes having the ordering of 314A, 314B, and 314C. Upon identifying element 310, manipulator 130 may modify element 310 to produce one of modified HTML elements 320A-320C in some embodiments.

Modified element 320A is an example of rearranging attributes 314A-C. As shown, element 320A now specifies attributes 314 in the ordering of 314B, 314A, and 314C. Again, modifying the order in this manner may interfere with malware that relied on particular parsing rule or attempted to compute a hash value for content that included element 320A.

Modified element 320B is an example of modifying an HTML identifier attribute. As shown, the character sequence "omniture_beacon_iframe" has been replaced by "JAsdlkj35sadf9" in the modified identifier attribute 314A. Again, modifying an identifier attribute in this manner may interfere with malware searching for a particular attribute identifier.

Modified HTML element 320C is an example of inserting white space. As shown, white space 322A and 322B have been inserted between attributes within element 320C. Again, in various embodiments, original HTML element 310 and modified HTML elements 320 still result in the same webpage being displayed on client device 102.

Figure 4A:
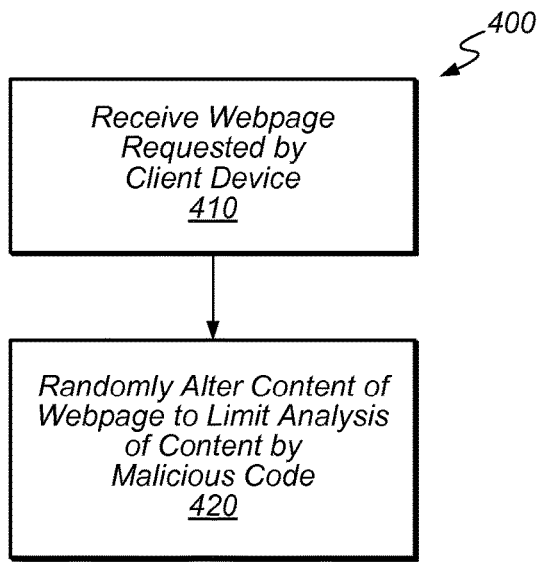
FIGS. 4A and 4B are flow diagrams illustrating embodiments of methods for modifying webpage content.

Turning now to FIG. 4A, a flowchart of a method 400 for manipulating webpage content is depicted. In one embodiment, method 400 is performed by a server system configured to deliver webpage content such as server system 100. In another embodiment, method 400 is performed by a separate computing system—e.g., a separate computing system providing manipulated webpage content to web server for delivery. In some instances, performance of method 400 may prevent malware from identifying the webpage content being viewed by a web browser.

In step 410, a webpage (e.g., webpage 112) requested by a client device (e.g., device 102) is received. In various embodiments, step 410 includes retrieving a webpage (or portions of a webpage) from a memory storing the webpage.

In step 420, content of the webpage is randomly altered to limit analysis of the content by malicious code (e.g., malicious code 122). In various embodiments, the altering, however, does not affect how the webpage is displayed by the client device. In various embodiments, step 420 includes searching (e.g., via attribute rearranger 210) the webpage for an element that specifies a plurality of attributes in a particular ordering and rearranging the plurality of attributes to have a new ordering different from the particular ordering. In some embodiments, the element is a hypertext markup language (HTML) element (e.g., element 310) that specifies the plurality of attributes (e.g., attributes 314) within a start tag (e.g., tag 312A). In one embodiment, a pseudo-random number generator (e.g., PRNG 240) is used to select the new ordering of the attributes. In various embodiments, step 420 includes parsing (e.g., via identifier scrambler 220) the webpage for an element that specifies an identifier attribute and modifying an identifier attribute of the element. In some embodiments, the attribute identifier is an identifier attribute within a hypertext markup language (HTML) frame tag (e.g., modified ID attribute 314A within start tag 312). In some embodiments, the altering includes inserting white space (e.g., white space 322) at one or more locations in the webpage. In one embodiment, a pseudo-random number generator (PRNG) is used to select the one or more locations to insert the white space. In one embodiments, a PRNG is used to select an amount of the white space to insert at the one or more locations.

In some embodiments, method 400 may further include serving the webpage with the altered content (e.g., manipulated webpages 132) to the client device. In other embodiments, method 400 may include sending the webpage to another computer system that serves the webpage to the client device.

Figure 4B:
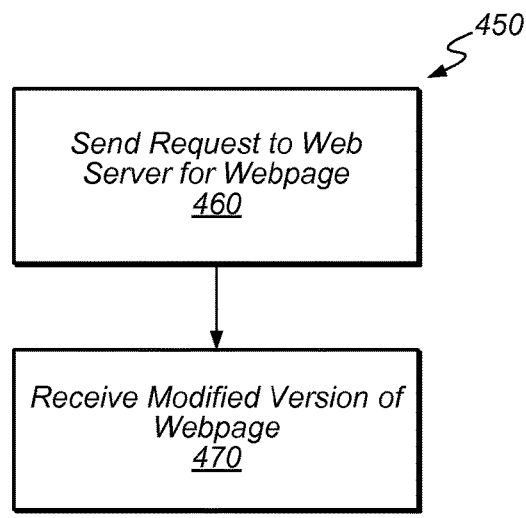

Turning now to FIG. 4B, a flowchart of a method 450 for manipulating webpage content is depicted. Method 450 is one embodiment of a method performed by a client device such as client device 102. In some instances, performance of method 450 may prevent malware from identifying the webpage content being viewed by a web browser.

In step 460, a request is sent to a web server (e.g., web server 110) for a webpage (e.g., webpage 112). In some embodiments, the unmodified version of the webpage includes a hypertext markup language (HTML) element (e.g., element 310) that specifies a plurality of HTML attributes in a particular ordering. In some embodiments, one of the plurality of HTML attributes in the unmodified version of the webpage specifies an identifier attribute (e.g., attribute 314A) having a particular character sequence.

In step 470, a modified version of the webpage is received. In various embodiments, the modified version of the webpage includes content that has been randomly modified in a manner that inhibits analysis by malicious code. In such an embodiment, the manner in which the content is modified does not alter how the webpage is displayed to a user of the client device. In some embodiments, the modified version of the webpage is generated by the web server in response to the request from the client device. In some embodiments, the modified version of the webpage includes an HTML element that specifies the plurality of HTML attributes in an ordering different from the particular ordering. In one embodiment, the modified version of the webpage specifies the identifier using a different character sequence than the particular character sequence. In some embodiments, the modified version of the webpage includes additional white space (e.g., white space 322) that is not present in the unmodified version of the webpage.

Exemplary Computer System

Figure 5:
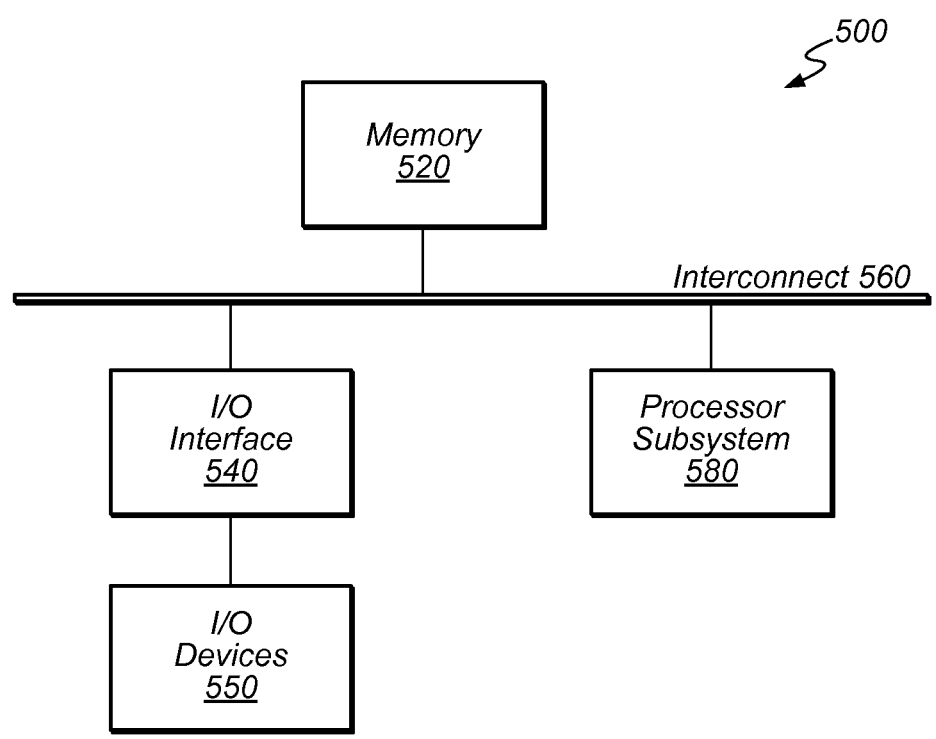
FIG. 5 is a block diagram illustrating one embodiment of an exemplary computer system.

Turning now to FIG. 5, a block diagram of an exemplary computer system 500, which may implement server system 100 and/or client device 102, is depicted. Computer system 500 includes a processor subsystem 580 that is coupled to a system memory 520 and I/O interfaces(s) 540 via an interconnect 560 (e.g., a system bus). I/O interface(s) 540 is coupled to one or more I/O devices 550. Computer system 500 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 500 is shown in FIG. 5 for convenience, system 500 may also be implemented as two or more computer systems operating together.

Processor subsystem 580 may include one or more processors or processing units. In various embodiments of computer system 500, multiple instances of processor subsystem 580 may be coupled to interconnect 560. In various embodiments, processor subsystem 580 (or each processor unit within 580) may contain a cache or other form of on-board memory. In some embodiments, components 110, 120, and/or 130 described above may be executable by processor subsystem 580.

System memory 520 is usable store program instructions executable by processor subsystem 580 to cause system 500 perform various operations described herein. System memory 520 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 500 is not limited to primary storage such as memory 520. Rather, computer system 500 may also include other forms of storage such as cache memory in processor subsystem 580 and secondary storage on I/O Devices 550 (e.g., a hard drive, storage array, etc.). In some embodiments, these other forms of storage may also store program instructions executable by processor subsystem 580 to perform operations described herein. Accordingly, in some embodiments, components 110-130 (as well as components 210-240) are program instructions stored in system memory 520 that are executable by processor subsystem 580 to perform various operations described herein.

I/O interfaces 540 may be any of various types of interfaces configured to couple to and communicate with other devices, according to various embodiments. In one embodiment, I/O interface 540 is a bridge chip (e.g., Southbridge) from a front-side to one or more back-side buses. I/O interfaces 540 may be coupled to one or more I/O devices 550 via one or more corresponding buses or other interfaces. Examples of I/O devices 550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 500 is coupled to a network via a network interface device 550 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored thereon that are capable of causing a computing system to implement operations comprising:
   receiving a webpage requested by a client device; and
   randomly altering content of the webpage, wherein the altering does not affect how the webpage is displayed by the client device, and wherein the altering includes:
      searching the webpage for a hypertext markup language (HTML) element that specifies a plurality of attributes in a particular ordering within a start tag; and
      rearranging the plurality of attributes to have a new ordering different from the particular ordering.

2. The computer readable medium of claim 1, wherein the operations include:
   serving the webpage with the altered content to the client device.

3. The computer readable medium of claim 1, wherein the operations include:
   using a pseudo-random number generator to select the new ordering of the attributes.

4. The computer readable medium of claim 1, wherein the altering includes:
   parsing the webpage for an element that specifies an identifier attribute; and
   modifying an identifier attribute of the element.

5. The computer readable medium of claim 4, wherein the attribute identifier is an identifier attribute within a hypertext markup language (HTML) frame tag.

6. The computer readable medium of claim 1, wherein the altering includes inserting white space at one or more locations in the webpage.

7. The computer readable medium of claim 6, wherein the operations include:
   using a pseudo-random number generator (PRNG) to select the one or more locations to insert the white space.

8. The computer readable medium of claim 7, wherein the operations includes:
   using the PRNG to select an amount of the white space to insert at the one or more locations.

9. A non-transitory computer readable medium having program instructions stored thereon that are capable of causing a computing system to implement operations comprising:
   storing a plurality of webpages of a website;
   randomly altering content of one of the plurality of webpages to produce a first version of the webpage and a second version of the webpage, wherein the second version of the webpage differs from the first version of the webpage, wherein the altering includes:

parsing the webpage to identify a hypertext markup language (HTML) element that specifies a plurality of attributes arranged in a particular ordering within a start tag; and altering the particular ordering of the plurality of attributes within the start tag to produce the first version of the webpage;

sending the first version of the webpage to a first client device; and sending the second version of the webpage to a second client device, wherein the first and second versions of the webpage appear the same on the first and second devices.

10. The computer readable medium of claim 9, wherein the operations further comprise:

after the altering, receiving a request for the webpage from the first client device; and sending the first version of the webpage to the first client device in response to the request.

11. The computer readable medium of claim 9, wherein the operations further comprise:

altering the particular ordering of the plurality of attributes to produce the second version of the webpage, wherein the particular ordering in the first version of the webpage differs from the particular ordering of the second version of the webpage.

12. The computer readable medium of claim 9, wherein the operations further comprise:

parsing the webpage to identify a plurality of instances of an identifier attribute within the webpage; and replacing each instance with a character sequence that differs from an original character sequence of the identifier attribute.

13. A method, comprising:

a client device sending a request to a web server for a webpage; and the client device receiving a modified version of the webpage, wherein the modified version of the webpage includes content that has been randomly modified, wherein the manner in which the content is modified does not alter how the webpage is displayed to a user of the client device; and wherein an unmodified version of the webpage includes a hypertext markup language (HTML) element that specifies a plurality of HTML attributes within a start tag and in a particular ordering, and wherein the modified version of the webpage includes an HTML element that specifies the plurality of HTML attributes within the start tag and in an ordering different from the particular ordering.

14. The method of claim 13, wherein the modified version of the webpage is generated by the web server in response to the request from the client device.

15. The method of claim 13, wherein one of the plurality of HTML attributes in the unmodified version of the webpage specifies an identifier attribute having a particular character sequence, and wherein the modified version of the webpage specifies the identifier attribute using a different character sequence than the particular character sequence.

16. The method of claim 13, wherein the modified version of the webpage includes additional white space that is not present in the unmodified version of the webpage.

* * * * *